United States Patent
Harada et al.

(10) Patent No.: US 9,334,392 B2
(45) Date of Patent: May 10, 2016

(54) CELLULOSE RESIN COMPOSITION

(71) Applicant: ADEKA CORPORATION, Tokyo (JP)

(72) Inventors: Masashi Harada, Saitama (JP); Yuji Yamazaki, Saitama (JP); Satoshi Kamimura, Saitama (JP); Yuki Tanaka, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/399,663

(22) PCT Filed: May 7, 2013

(86) PCT No.: PCT/JP2013/062855
§ 371 (c)(1),
(2) Date: Nov. 7, 2014

(87) PCT Pub. No.: WO2013/168713
PCT Pub. Date: Nov. 14, 2013

(65) Prior Publication Data
US 2015/0135990 A1     May 21, 2015

(30) Foreign Application Priority Data
May 9, 2012  (JP) ................. 2012-107969

(51) Int. Cl.
| | | |
|---|---|---|
| C08L 1/00 | (2006.01) | |
| C08L 1/10 | (2006.01) | |
| C08J 5/18 | (2006.01) | |
| C08L 1/12 | (2006.01) | |
| C08J 3/18 | (2006.01) | |
| G02B 1/04 | (2006.01) | |
| C08B 3/16 | (2006.01) | |

(52) U.S. Cl.
CPC ... *C08L 1/10* (2013.01); *C08B 3/16* (2013.01); *C08J 3/18* (2013.01); *C08J 5/18* (2013.01); *C08L 1/12* (2013.01); *G02B 1/04* (2013.01); *C08J 2301/12* (2013.01); *C08J 2467/02* (2013.01)

(58) Field of Classification Search
CPC ..................................................... C08L 59/00
See application file for complete search history.

(56) References Cited

U.S. PATENT DOCUMENTS

| | | | |
|---|---|---|---|
| 3,830,785 A | * | 8/1974 | Matsui et al. ............... 528/45 |
| 5,786,442 A | | 7/1998 | Harmsen |
| 2008/0262151 A1 | * | 10/2008 | Ishii et al. ............... 524/599 |
| 2009/0169775 A1 | | 7/2009 | Mukunoki et al. |

FOREIGN PATENT DOCUMENTS

| | | |
|---|---|---|
| JP | 3-66727 A | 3/1991 |
| JP | 3-140323 A | 6/1991 |
| JP | 11-209482 A | 8/1999 |
| JP | 2009-173740 A | 6/2009 |
| JP | 2009-155454 A | 7/2009 |
| JP | 2009-155455 A | 7/2009 |
| JP | 2009-173741 A | 8/2009 |
| JP | 2009-173742 A | 8/2009 |
| JP | 2009-299014 A | 12/2009 |

OTHER PUBLICATIONS

International Search Report dated Jul. 30, 2013 for International Application No. PCT/JP2013/062855.

* cited by examiner

*Primary Examiner* — Melvin C Mayes
*Assistant Examiner* — Kenneth Vaden
(74) *Attorney, Agent, or Firm* — Birch, Stewart, Kolasch & Birch, LLP

(57) ABSTRACT

Provided is a cellulose resin composition wherein roll contamination during processing and reduction in the productivity caused by roll contamination are inhibited. The cellulose resin composition is obtained by adding a polyester-based plasticizer to a cellulose resin, the cellulose resin composition being characterized in that the polyester-based plasticizer is produced from a polybasic acid, a polyhydric acid and, as required, a stopper, in which polyester-based plasticizer, components having a molecular weight of 430 or less are removed to an amount of 5 wt % or less.

10 Claims, No Drawings

CELLULOSE RESIN COMPOSITION

TECHNICAL FIELD

The present invention relates to a cellulose resin composition. More particularly, the present invention relates to a cellulose resin composition that is suitable for obtaining a cellulose ester film preferred as a polarizing plate or a protective film for a polarizing plate, in which cellulose resin composition a specific polyester-based plasticizer is added.

BACKGROUND ART

Compared to other synthetic resins, cellulose resins are mainly characterized by generally having superior strength, transparency, gloss and sheen, as well as a smoother surface with excellent texture. Therefore, cellulose resins are used in a very wide variety of applications such as sheets, films, wire coatings, toys, medical instruments and food packaging materials.

However, since cellulose resins are not thermoplastic, they have to be melted at a high temperature or dissolved into a solvent upon being molded. Yet, when melted at a high temperature, cellulose resins are thermally decomposed at the same time and become colored. In order to avoid this problem, it is necessary to blend an appropriate plasticizer to lower the softening point of the cellulose resin. For this purpose, for example, triphenyl phosphate, tricresyl phosphate, diphenyl phosphate, triethyl phosphate, tributyl phosphate, dimethyl phthalate, diethyl phthalate, dimethoxyethyl phthalate, ethyl phthalyl ethyl glycolate, butyl phthalyl butyl glycolate, toluenesulfonamide, triacetin and pentaerythritol tetraacetate are conventionally used.

Nonetheless, at present, none of the above-described plasticizers satisfies a wide range of performances such as compatibility with cellulose resins, plasticizing efficiency, non-volatility, stability against heat and light, non-migratory properties, non-extractability and water resistance, and this is impeding further expansion of the use of cellulose resin compositions.

In view of this, Patent Documents 1 to 4 propose cellulose resin compositions in which a variety of polyester-based plasticizers are blended.

RELATED ART DOCUMENTS

Patent Documents

Patent Document 1: Japanese Unexamined Patent Application Publication No. 2009-173740
Patent Document 2: Japanese Unexamined Patent Application Publication No. 2009-173741
Patent Document 3: Japanese Unexamined Patent Application Publication No. 2009-173742
Patent Document 4: Japanese Unexamined Patent Application Publication No. 2009-191219

SUMMARY OF THE INVENTION

Problems to be Solved by the Invention

However, those cellulose resin compositions that are disclosed in the above-mentioned Patent Documents are still not satisfactory because they have problems of, for example, adhesion of constituents to a roll due to vaporization during processing and reduction in the film yield.

Therefore, an object of the present invention is to provide a cellulose resin composition wherein roll contamination during processing and reduction in the productivity caused by roll contamination are inhibited.

Means for Solving the Problems

The present inventors intensively studied to discover that the above-described object can be achieved by incorporating a polyester-based plasticizer in which components having a molecular weight of 430 or less are removed to an amount of 5 wt % (mass %), thereby arriving at the present invention.

That is, the cellulose resin composition of the present invention is a cellulose resin composition obtained by adding a polyester-based plasticizer to a cellulose resin, the cellulose resin composition being characterized in that the polyester-based plasticizer is produced from a polybasic acid, a polyhydric alcohol and, as required, a stopper, in which polyester-based plasticizer components having a molecular weight of 430 or less are removed to an amount of 5 wt % or less.

In the cellulose resin composition of the present invention, it is preferred that the above-described polybasic acid contain at least one selected from the group consisting of terephthalic acid, succinic acid and adipic acid.

In the cellulose resin composition of the present invention, it is also preferred that the above-described polyhydric alcohol contain at least ethylene glycol or propylene glycol.

Further, in the cellulose resin composition of the present invention, it is preferred that the above-described polyester-based plasticizer be one in which components having a molecular weight of 430 or less are removed to an amount of 5 wt % or less by thin-film distillation.

Still further, it is preferred that the cellulose resin composition of the present invention contain the above-described polyester-based plasticizer in an amount of 3 to 50 parts by mass with respect to 100 parts by mass of the cellulose resin.

Yet still further, in the cellulose resin composition of the present invention, it is preferred that the above-described cellulose resin be cellulose triacetate.

The method of producing a polyester-based plasticizer according to the present invention is a method of producing a polyester-based plasticizer for a cellulose resin composition, the method being characterized by comprising the steps of: performing a dehydration-condensation reaction using a polybasic acid, a polyhydric alcohol and, as required, a stopper; and subsequently removing components having a molecular weight of 430 or less to an amount of 5 wt % or less by thin-film distillation.

Effects of the Invention

According to the present invention, a cellulose resin composition wherein roll contamination during processing and reduction in the productivity caused by roll contamination are inhibited. The cellulose resin composition of the present invention can be suitably used as a liquid crystal display member, such as a polarizing plate, a polarizing plate protective film, a phase-contrast plate, a reflective plate, a view angle-improving film, an antiglare film, a nonreflective film or an antistatic film.

MODE FOR CARRYING OUT THE INVENTION

The cellulose resin composition of the present invention will now be described in detail.

The cellulose resin used in the present invention may be any cellulose resin; however, it is preferably a lower fatty acid ester of cellulose. The "lower fatty acid" in the lower fatty acid ester of cellulose means a fatty acid having not more than 6 carbon atoms, and examples of such lower fatty acid ester of cellulose include cellulose acetate, cellulose propionate and cellulose butyrate, as well as mixed fatty acid esters such as cellulose acetate propionate and cellulose acetate butyrate that are described in, for example, Japanese Unexamined Patent Application Publication No. H10-45804, Japanese Unexamined Patent Application Publication No. H8-231761 and U.S. Pat. No. 2,319,052 (Specification). Among these lower fatty acid esters of cellulose, cellulose triacetate is particularly preferably used.

In cases where cellulose triacetate is used as the cellulose resin, from the standpoint of the strength of the resulting film, it is preferred that the cellulose triacetate have a polymerization degree of 250 to 400 and an average acetylation degree (amount of bound acetic acid) of 54.0 to 62.5%, and it is more preferred that the cellulose triacetate have an average acetylation degree of 58.0 to 62.5%.

The most preferred lower fatty acid ester of cellulose is a cellulose ester which comprises an acyl group having 2 to 4 carbon atoms as a substituent and satisfies both of the Formulae (I) and (II) at the same time:

$$2.6 \leq X+Y \leq 3.0 \quad \text{Formula (I)}$$

$$0 \leq X \leq 2.5 \quad \text{Formula (II)}$$

(wherein, X represents the degree of substitution with acetyl group; and Y represents the degree of substitution with propionyl group or butyryl group).

Among the above-described cellulose esters, cellulose acetate propionates are preferred, and those satisfying $1.9 \leq X \leq 2.5$ and $0.1 \leq Y \leq 0.9$ are more preferred. The part not substituted with an acyl group usually exists as a hydroxyl group. These cellulose acetate propionates can be synthesized by a known method.

As the cellulose ester, cellulose esters synthesized using cotton linter, wood pulp, kenaf or the like as raw material may be used individually or in combination. It is particularly preferred to use a cellulose ester synthesized from cotton linter (hereinafter, may be simply referred to as "linter") individually or a plurality of such cellulose esters in combination.

Examples of polybasic acid that can provide the polyester-based plasticizer of the present invention include dibasic acids such as malonic acid, succinic acid, glutaric acid, adipic acid, sebacic acid, azelaic acid, dodecanedicarboxylic acid, phthalic acid, isophthalic acid, terephthalic acid and naphthalene dicarboxylic acid. In addition, a small ratio of a carboxylic acid having three or more carboxyl groups, such as trimellitic acid, pyromellitic acid, butanetricarboxylic acid, tricarballylic acid or citric acid, can also be used. Thereamong, those polybasic acids which contain at least one selected from succinic acid, adipic acid and terephthalic acid in an amount of 90 mol % or more with respect to the total amount of each polybasic acid are preferred because such polybasic acids have excellent compatibility with cellulose resins.

Examples of polyhydric alcohol that can provide the polyester-based plasticizer of the present invention include ethylene glycol, diethylene glycol, propylene glycol, 1,3-propanediol, 2-methyl-1,3-propanediol, 2,2-dimethyl-1,3-propanediol, 2,2-diethyl-1,3-propanediol, 1,2-butanediol, 1,3-butanediol, 1,4-butanediol, 1,5-pentanediol, 1,6-hexanediol, 3-methyl-L5-pentanediol, 2-ethyl-1,3-hexanediol and 2,2,4-trimethyl-1,3-pentanediol. In addition, a small ratio of an alcohol having three or more hydroxyl groups, such as glycerin, trimethylolpropane, trimethylolethane or pentaerythritol, can also be used. Thereamong, those polyhydric alcohols which contain ethylene glycol and/or 1,2-propylene glycol in an amount of 90 mol % or more with respect to the total amount of each polyhydric alcohol are preferred because such polyhydric alcohols have excellent compatibility with cellulose resins.

Examples of stopper that can provide the polyester-based plasticizer of the present invention include monohydric alcohols such as methanol, ethanol, propanol, isopropanol, butanol, sec-butanol, isobutanol, hexanol, isohexanol, heptanol, isoheptanol, octanol, isooctanol, 2-ethylhexanol, nonyl alcohol, isononyl alcohol, decanol, isodecanol and benzyl alcohol; and monobasic acids such as acetic acid, propionic acid, butyric acid, isobutyric acid, octylic acid, 2-ethylhexylic acid, lauric acid, myristic acid, palmitic acid, stearic acid, benzoic acid and toluic acid.

The number-average molecular weight of the polyester-based plasticizer of the present invention is preferably 600 to 2,000, more preferably 600 to 1,500. Polyester-based plasticizers having a number-average molecular weight of higher than 2,000 may have a reduced compatibility.

Further, the acid value of the above-described polyester-based plasticizer is preferably not higher than 1.

The above-described polyester-based plasticizer can be produced by a known method, for example, using the above-described polybasic acid and the above-described polyhydric alcohol along with, as required, the above-described stopper, in the presence of a catalyst such as dialkyl tin oxide or tetraalkyl titanate. The ratio of each component used in the production is variable depending on the type of the component to be used as well as the properties, molecular weight and the like of the desired polyester-based plasticizer; however, generally, the polybasic acid, polyhydric alcohol and stopper are used at ratios of 10 to 80 wt %, 10 to 80 wt % and 0 to 50 wt %, respectively.

Examples of a method of removing components having a molecular weight of 430 or less include thin-film distillation, column method and membrane separation, and thin-film distillation is preferred from the standpoints of the easiness of separation, the versatility of apparatus (cost, processing amount and operability) and the like. Thin-film distillation is a distillation method characterized in that the target compound, substance, mixture or the like is made into a thin film so as to increase its surface area, contact area with vacuum and the like, thereby increasing the vaporization efficiency. The thin film formation can be carried out by centrifugation or using a roller wiper or the like. Thin-film distillation can be carried out using, for example, a centrifugal thin-film distillation apparatus.

In the polyester-based plasticizer according to the present invention, the content of a component(s) having a molecular weight of 430 or less is 5 wt % or less, preferably 2 wt % or less, more preferably 1.5 wt % or less. Particularly when a large amount of monomer is contained in the polyester-based plasticizer, roll contamination during processing and a reduction in the productivity caused by roll contamination are likely to occur; therefore, the monomer content is preferably small. For instance, in the case of a polyester-based plasticizer obtained from ethylene glycol, succinic acid and acetic acid, since the dimeric component has a molecular weight of 434, the monomer content can be reduced by reducing the content of the components having a molecular weight of 430 or less. Here, the content of the components having a molecular weight of 430 or less can be easily determined by, for example, liquid chromatography (HPLC) analysis using a GPC column.

In the present invention, the above-described polyester-based plasticizer is added in an amount of 3 to 50 parts by mass, preferably 5 to 30 parts by mass, with respect to 100 parts by mass of the cellulose resin. When the above-described amount is less than 3 parts by mass, the flexibility-imparting effect may not be attained, while when the amount exceeds 50 parts by mass, bleeding may occur; therefore, such amount of the polyester-based plasticizer is not preferred.

Further, in the composition of the present invention, a variety of additives, such as a phosphorous-based, phenolic or sulfur-based antioxidant, an ultraviolet absorber and a hindered amine-based light stabilizer, may also be incorporated.

Examples of the phosphorus-based antioxidant include triphenyl phosphite, tris(2,4-di-tert-butylphenyl)phosphite, tris(nonylphenyl)phosphite, tris(dinonylphenyl)phosphite, tris(mono-, di-mixed nonylphenyl)phosphite, bis(2-tert-butyl-4,6-dimethylphenyl)ethyl phosphite, diphenyl acid phosphite, 2,2'-methylene-bis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol)-1,4-cyclohexanedimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol-pentaerythritol diphosphite, tetra(C12-15 mixed alkyl)-4,4'-isopropylidenediphenyl phosphite, bis[2,2'-methylene-bis(4,6-diamylphenyl)]-isopropylidenediphenyl phosphite, hydrogenated-4,4'-isopropylidenediphenol polyphosphite, bis(octylphenyl)-bis[4,4'-n-butylidene-bis(2-tert-butyl-5-methylphenol)]-1,6-hexanediol diphosphite, tetratridecyl-4,4'-butylidene-bis(2-tert-butyl-5-methylphenol)diphosphite, hexa(tridecyl)-1,1,3-tris(2-methyl-5-tert-butyl-4-hydroxyphenyl)butane triphosphonite, 9,10-dihydro-9-oxa-10-phosphaphenanthrene-10-oxide and 2-butyl-2-ethylpropanediol-2,4,6-tri-tert-butylphenol monophosphite.

Examples of the above-described phenolic antioxidant include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane] and triethylene glycol-bis[β-(3-tert-butyl-4-hydroxy-5-methylphenyl)propionate].

Examples of the above-described sulfur-based antioxidant include dialkyl thiodipropionates such as dilauryl thiodipropionate, dimyristyl thiodipropionate, myristylstearyl thiodipropionate and distearyl thiodipropionate; and β-alkylmercaptopropionates of polyols such as pentaerythritol-tetra(β-dodecylmercaptopropionate).

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyethoxyl)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed-alkoxycarbonylethylphenyl)triazole, 2-(2-hydroxy-3,5-dicumylphenyl)benzotriazole, 2,2'-methylene-bis(4-tert-octyl-6-benzotriazolylphenol) and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine and 2-(2-hydroxy-4-acryloyloxyethoxyphenyl)-4,6-bis(2,4-dimethylphenyl)-1,3,5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the above-described hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis(1,2,2,6,6-pentamethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).bis(tridecyl)-1,2,3,4-butane tetracarboxylate, bis(1,2,2,6,6-pentamethyl-4-piperidyl).bis (tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyamino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, and 3,9-bis[1,1-dimethyl-2-

{tris(1,2,2,6,6-pentamethyl-4-piperidyloxycarbonyloxy) butylcarbonyloxy}ethyl]-2,4,8,10-tetraoxaspiro[5.5] undecane.

In addition to the above, in the composition of the present invention, as required, other additives, such as a filler, a coloring agent, a cross-linking agent, an antistatic agent, an anti-plate-out agent, a surface treatment agent, a lubricant, a flame retardant, a fluorescent agent, an antifungal agent, an antibacterial agent, a metal inactivator, a releasing agent, a pigment, a processing aid, an antioxidant, a light stabilizer and a foaming agent, may also be incorporated.

The cellulose resin composition of the present invention can be used in a variety of applications by known processing methods; however, because of its properties, the cellulose resin composition of the present invention is particularly preferably used as, for example, a polarizing plate or a film such as a polarizing plate protective film.

Next, a method of producing a cellulose ester film composed of the cellulose resin composition of the present invention (hereinafter, may be referred to as "the cellulose ester film of the present invention") will be described.

The cellulose ester film of the present invention is produced by applying and drying a dope solution in which a cellulose ester is dissolved in a solvent. A variety of additives may be added to the dope solution as required. A higher concentration of the cellulose ester in the dope solution is more preferred because the drying load required after flow-casting of the dope solution onto a support can be more reduced; however, an excessively high concentration of the cellulose ester increases the filtering load and thus reduces the filtration accuracy. In order to attain satisfactory drying load and filtering load, the concentration of the cellulose ester is preferably 10 to 30 wt %, more preferably 15 to 25 wt %.

For the preparation of the dope solution of the present invention, a solvent may be used individually, or two or more solvents may be used in combination. From the standpoint of the production efficiency, it is preferred to use a good solvent and poor solvent of cellulose ester in combination. The mixing ratio of the good solvent and that of the poor solvent are preferably in the ranges of 70 to 98 wt % and 30 to 2 wt %, respectively. With regard to the good solvent and poor solvent that are used in the present invention, a solvent which independently dissolves the cellulose ester used is defined as "good solvent", and a solvent which, by itself, can only swell the cellulose ester used or cannot dissolve the cellulose ester, is defined as "poor solvent". Therefore, the good solvent and poor solvent are variable depending on the average acetylation degree of the cellulose. For instance, acetone is a good solvent for cellulose esters having an average acetylation degree of 55%, while it is a poor solvent for cellulose esters having an average acetylation degree of 60%. As apparent from the above description, the good solvent and poor solvent are not always unambiguously determined in all cases. For those cases where the cellulose resin is cellulose triacetate, organic halogen compounds such as methylene chloride and dioxolanes are exemplified as good solvents that can be used in the present invention and, for those cases where the cellulose resin is cellulose acetate propionate, methylene chloride, acetone and methyl acetate are exemplified as good solvents, and methanol, ethanol, n-butanol, cyclohexane and cyclohexanone are exemplified as poor solvents.

As a method of dissolving a cellulose ester in the preparation of the above-described dope solution, any commonly used method can be employed; however, it is preferred to employ a method in which the cellulose ester is dissolved with stirring by heating under pressure in a temperature range which is not lower than the boiling point of the solvent under normal pressure and where the solvent does not boil, because such a method inhibits generation of an aggregated undissolved matter called gel or lump. Alternatively, a method in which the cellulose ester is mixed with a poor solvent so as to be wetted or swollen and the resulting cellulose ester is subsequently dissolved in a good solvent by mixing can also be preferably employed. Further, a known cold dissolution method may be employed as well. In cases where a cold dissolution method is employed, methyl acetate or acetone may be used as the good solvent. Pressurization can be carried out by a method of injecting an inert gas such as nitrogen gas or by increasing the vapor pressure of the solvent by heating. It is preferred that the heating be performed externally and, for example, a jacket-type heater is preferably used because the temperature is easily controllable.

From the standpoint of the solubility of cellulose ester, the heating temperature after the addition of solvent is preferably in a range which is not lower than the boiling point of the solvent under normal pressure and where the solvent does not boil. When the heating temperature is excessively high, the required pressure is increased, so that the productivity is reduced. The heating temperature is in the range of preferably 45 to 120° C., more preferably 60 to 110° C., still more preferably 70 to 105° C. Further, the pressure is adjusted such that the solvent does not boil at a preset temperature. Subsequently, the resulting cellulose ester solution is filtered using an appropriate filter medium such as a filter paper. As the filter medium, one having a lower absolute filtration accuracy is more preferred for removal of undesired matters and the like; however, an excessively low absolute filtration accuracy leads to a problem that clogging of the filter medium is likely to occur. In view of this, the absolute filtration accuracy of the filter medium is preferably not 0.008 mm or less, more preferably in the range of 0.001 to 0.008 mm, still more preferably in the range of 0.003 to 0.006 mm. The material of the filter medium is not particularly restricted, and the filter medium may be made of any commonly used material; however, filter media made of a plastic such as polypropylene or Teflon (Registered Trademark) and filter media made of a metal such as stainless steel are preferred because these filter media do not cause fiber fall-off and the like.

The filtration of the dope solution can be carried out by an ordinary method; however, it is preferred to employ a method in which the dope solution is filtered under pressure while being heated in a temperature range which is not lower than the boiling point of the solvent used under normal pressure and where the solvent does not boil, because the increase in the difference between the pressures on each side of the filter medium (hereinafter, may be referred to as "filtration pressure") is small. The filtration temperature is preferably 45 to 120° C., more preferably 45 to 70° C., still more preferably 45 to 55° C. The smaller the filtration pressure, the more preferred it is. The filtration pressure is preferably not higher than $1.6 \times 10^6$ Pa, more preferably not higher than $1.2 \times 10^6$ Pa, still more preferably not higher than $1.0 \times 10^6$ Pa.

The substrate used in the flow-casting (casting) step is preferably one made of endless belt-form or drum-form mirror-finished stainless steel. It is preferred that the temperature of the substrate in the casting step be 0° C. to lower than the boiling point of the solvent. A higher temperature enables a faster drying rate; however, an excessively high temperature may cause foaming and deteriorate the flatness of the substrate. The substrate temperature is preferably 0 to 50° C., more preferably 5 to 30° C. The method of controlling the substrate temperature is not particularly restricted and, for example, a method in which warm air or cold air is blown onto the substrate or a method in which a warm-water vat is brought into contact with the substrate may be employed. The method using a warm-water vat is preferred because heat is transferred more efficiently and the time required for bringing the substrate to a constant temperature is thus shorter. In cases where warm air is used, it is necessary to use an air having a temperature higher than the target temperature. In order to allow the cellulose ester film to exhibit good flatness, the amount of residual solvent at the time of removing the film from the substrate is preferably 10 to 120%, more preferably 20 to 40% or 60 to 120%, particularly preferably 20 to 30% or 70 to 115%.

In the present invention, the amount of residual solvent is defined by the following formula:

Amount of residual solvent=[(film mass before heat treatment−film mass after heat treatment)/(film mass after heat treatment)]×100(%).

Here, the heat treatment performed in the measurement of the amount of residual solvent refers to heating of the film at 115° C. for 1 hour. Further, in the step of drying the cellulose ester film, the film removed from the substrate is further dried such that the amount of residual solvent becomes preferably 3 wt % or less, more preferably 0.5 wt % or less. In the film drying step, generally, a method in which the film is dried while being transferred by a roll suspension system or tenter system is employed.

It is preferred that the film be subjected to width maintenance or stretching by a tenter system immediately after being removed from the substrate while a large amount of solvent still remains therein, because this exerts superior dimensional stability-improving effect. The means for drying the film is not particularly restricted, and it is performed using a hot air, infrared radiation, heating roll, microwave or the like. From the standpoint of simplicity, it is preferred that the drying be performed using hot air. It is preferred that the drying temperature be increased stepwise in the range of 40 to 150° C. and, in order to improve the dimensional stability, it is more preferred that the drying be performed at a temperature of 50 to 140° C.

The smaller the thickness of the cellulose ester film, the more preferred it is, because this allows the resulting polarizing plate to be thinner and makes it easier to reduce the thickness of a liquid crystal display. However, an excessively thin cellulose ester film results in an increased moisture permeability, which leads to insufficient tearing strength and the like. In order to attain both low moisture permeability and sufficient tearing strength, the thickness of the cellulose ester film is preferably 10 to 65 μm, more preferably 20 to 60 μm, still more preferably 35 to 50 μm.

Since the cellulose ester film of the present invention is capable of attaining low moisture permeability, high dimensional stability and the like, it can be preferably used as a liquid crystal display member. The term "liquid crystal display member" refers to a member used in a liquid crystal display device, and examples thereof include polarizing plates, protective films of polarizing plates, phase-contrast plates, reflective plates, viewing angle-improving films, antiglare films, nonreflective films and antistatic films. Thereamong, the cellulose ester film of the present invention can be preferably used as a polarizing plate or a protective film of a polarizing plate.

A polarizing plate can be produced by a conventional method. For example, there is a method in which the cellulose ester film of the present invention is subjected to an alkaline saponification treatment and subsequently, using a completely saponified polyvinyl alcohol aqueous solution, the thus treated cellulose ester film is laminated on both sides of a polarizing film produced by immersion and stretching of a film in an iodine solution. The alkaline saponification treatment refers to a treatment in which the cellulose ester film is immersed in a hot strong alkaline solution for the purpose of improving the wetting with water-based adhesive and, thus, the adhesiveness of the film.

EXAMPLES

The cellulose resin composition of the present invention will now be described in more detail by way of production examples and working examples; however, the present invention is not restricted thereto by any means.

Polyester-based plasticizers were produced in accordance with the respective formulations shown in Table 1 below. The production method was as follows. A polybasic acid, a polyhydric alcohol and a stopper were loaded to a reaction vessel and tetraisopropyl titanate was added thereto as a catalyst. If necessary, pseudocumene was also added as a solvent, and the resulting mixture was heated with stirring. Water generated as a by-product was removed under normal pressure and reduced pressure, and the temperature of the mixture was eventually raised to 220 to 230° C. to complete dehydration-condensation reaction. In this process, when bulk synthesis was difficult, the reaction between the polybasic acid and the polyhydric alcohol was performed separately from the reaction with the stopper. In Table 1, "AV", "OHV" and "MW" denote acidic value, hydroxyl value and average molecular weight, respectively.

TABLE 1

|  | Polybasic acid | Polyhydric alcohol | Stopper | AV | OHV | Mw |
| --- | --- | --- | --- | --- | --- | --- |
| No. 1 | succinic acid/terephthalic acid (70/30) | ethylene glycol/propylene glycol (50/50) | acetic acid | 0.2 | 1.0 | 600 |
| No. 2 | succinic acid/terephthalic acid (50/50) | ethylene glycol/propylene glycol (50/50) | acetic acid | 0.4 | 0.5 | 900 |
| No. 3 | adipic acid/terephthalic acid (60/40) | ethylene glycol/propylene glycol (50/50) | acetic acid | 0.5 | 1.2 | 650 |
| No. 4 | succinic acid/terephthalic acid (50/50) | ethylene glycol/propylene glycol (70/30) | acetic acid | 0.4 | 0.2 | 700 |
| No. 5 | succinic acid/terephthalic acid (50/50) | ethylene glycol/propylene glycol (50/50) | benzoic acid | 0.8 | 8 | 1,000 |

Note:
The number in parentheses represents the molar ratio of each mixture.

The thus obtained polyester-based plasticizers (Comparative Examples 1 to 5) and these plasticizers that were subjected to thin-film distillation at a pressure of 0.3 torr and an ambient temperature of 250° C. using a thin-film distillation apparatus (Examples 1 to 5) were each subjected to the following evaluations.

[Low-Molecular-Weight Content]

By GPC analysis, the content (wt %) of components having a molecular weight of 430 or less in each polyester-based plasticizer was determined.

[Roll Contamination]

In a mixed solvent composed of 90 parts by mass of methylene chloride and 10 parts by mass of methyl alcohol, acetyl cellulose (acetylation degree: 61.5%, polymerization degree: 260) was dissolved with stirring to prepare a solution having a concentration of 15%. Then, 10 parts by mass of each plasticizer shown in Table 1 was mixed with the acetyl cellulose and the resulting solution was flow-casted onto a metal support to form a film of about 0.1 mm in thickness. After detaching the thus formed film from the metal support, contamination of the metal support was visually evaluated based on the following criteria.

⊚: No roll contamination was observed.
○: Almost no roll contamination was observed.
Δ: Roll contamination was observed.
x: Prominent roll contamination was observed.

TABLE 2

| | Plasticizer | Low-molecular-weight content | Roll contamination |
|---|---|---|---|
| Example 1 | No. 1 | 1.2 | ⊚ to ○ |
| Example 2 | No. 2 | 0.5 | ⊚ |
| Example 3 | No. 3 | 0.4 | ⊚ |
| Example 4 | No. 4 | 0.3 | ⊚ |
| Example 5 | No. 5 | 0.7 | ⊚ |
| Comparative Example 1 | No. 1 | 14.9 | X |
| Comparative Example 2 | No. 2 | 6.8 | X to Δ |
| Comparative Example 3 | No. 3 | 12.2 | X |
| Comparative Example 4 | No. 4 | 9.2 | X to Δ |
| Comparative Example 5 | No. 5 | 10.5 | X |

The invention claimed is:

1. A cellulose resin composition obtained by adding a polyester-based plasticizer to a cellulose resin, said cellulose resin composition being characterized in that said polyester-based plasticizer is produced from a polybasic acid, a polyhydric alcohol and, as required, a stopper,
   in which polyester-based plasticizer, components having a molecular weight of 430 or less are in an amount of 0.7 wt % or less.

2. The cellulose resin composition according to claim 1, wherein said polybasic acid comprises at least one selected from the group consisting of terephthalic acid, succinic acid and adipic acid.

3. The cellulose resin composition according to claim 1, wherein said polyhydric alcohol comprises at least ethylene glycol or propylene glycol.

4. The cellulose resin composition according to claim 1, wherein said polyester-based plasticizer is one in which components having a molecular weight of 430 or less are removed to an amount of 0.7 wt % or less by thin-film distillation.

5. The cellulose resin composition according to claim 1, comprising said polyester-based plasticizer in an amount of 3 to 50 parts by mass with respect to 100 parts by mass of said cellulose resin.

6. The cellulose resin composition according to claim 1, wherein said cellulose resin is cellulose triacetate.

7. A method of producing a polyester-based plasticizer for a cellulose resin composition, said method being characterized by comprising the steps of:
   performing a dehydration-condensation reaction using a polybasic acid, a polyhydric alcohol and, as required, a stopper; and
   subsequently removing components having a molecular weight of 430 or less to an amount of 0.7 wt % or less by thin-film distillation.

8. A liquid crystal display member, comprising the cellulose resin composition of claim 1.

9. A plate, comprising the cellulose resin composition of claim 1, selected from the group consisting of polarizing plates, phase-contrast plates and reflective plates.

10. A film, comprising the cellulose resin composition of claim 1, selected from the group consisting of protective films of polarizing plates, viewing angle-improving films, antiglare films, nonreflective films and antistatic films.

* * * * *